Patented Apr. 13, 1926.

UNITED STATES PATENT OFFICE.

AAGE GUSMER, OF NEWARK, NEW JERSEY.

PROCESS FOR PRODUCING A JELLY BASE.

No Drawing.   Application filed January 10, 1921. Serial No. 436,327.

*To all whom it may concern:*

Be it known that I, AAGE CUSMER, a subject of the King of Denmark, and a resident of the city of Newark, Essex County, and State of New Jersey, have invented certain new and useful Improvements in Processes for Producing a Jelly Base, of which the following is a description.

This invention relates to a process for producing a jelly base and has for its primary object to provide an improved process for the treatment of a pectose extract obtained from fruits or vegetables so that by boiling the extract with the addition of sugar and water for a short time, a clear, firm and brilliant jelly will be produced.

More particularly the present improvement contemplates a process for treating the pectose extract whereby the albuminoids thereof are converted into modified forms so that they will not coagulate in the solution or extract and render the same turbid when made into jelly.

It is the present practice in this art, in order to eliminate starch turbidity to treat the extract with a diastatic enzyme which acts to convert the starch into sugar, but in so far as I am aware it has not been heretofore recognized that such turbidity is caused in no small part by the albumen constituents in the extracts. Albuminoids have a very complex chemical structure but they may be converted into modified forms. It is desirable to retain the albumen in the extract as it renders the same palatable and materially aids digestion. However, in its original form the albumen precipitates in the solution and renders the same cloudy or turbid when made into jelly. From a commercial standpoint, such turbidity is very objectionable. I have found that the albumen may be readily converted into modified forms in which it is in solution in the extract by the use of a proteolytic enzyme. The proteolytic action takes place while the pectose extract is hot and continues its activity after filtering of the extract and during evaporation or condensation (if done by vacuum) thereof, converting the albuminoids into more desirable forms.

In one embodiment of my invention, I employ a comminuted fungi which possesses both diastatic and proteolytic enzymatic properties so that the two actions take place concurrently in the extract. The diastatic reaction with the starch constituents of the extract converts the starch into sugar. After the conversion of the starch which is desirable in order that the extract may be filtered to remove the solids therefrom, the proteolytic action which is in the nature of a peptonizing fermentation continues and the albuminoids in the extract are thereby reduced to the simpler and more desirable forms.

As one practical example of the manner in which my improved process may be carried out, apple waste or pomace such as is obtained as the residue or by-product in cider or vinegar making, is boiled under pressure for a short period of time, the length of time varying according to the ripeness of the fruit. If no pressure is available then the boiling is continued for a longer time. It will be understood that this apple waste or pomace is substantially free of saccharinous matters which are removed when the juices are liberated from the fruit by pressing or diffusing the grated fruit with cold water. If, however, it is found that the material contains considerable saccharinous matters it may be diffused with cold water one or more times until it is practically wholly devoid thereof.

I have above referred to the use of apple waste or pomace, but it will be understood that this process may be applied to various other fruits or vegetables which I shall hereinafter broadly designate as vegetable material, and which yield jelly forming substances. However, apples, because of their cheapness and large content of pectose are especially serviceable as a source from which the jelly base may be obtained. In addition, however, I may use, grapes, oranges, quinces and other fruits, as well as beets, rhubarb, etc., the latter being particularly rich in pectin.

To about five hundred pounds (500 lbs.) of substantially dry pulpy apple or other vegetable material, I add approximately seven hundred and fifty (750) gallons of water and before boiling the same an acid is added thereto, preferably phosphoric or lactic acid in such amount that the solution shows an acidity of approximately two-tenths of one percent. The purpose in adding this acid is to aid in converting the albuminoids naturally contained in the vegetable material into a less complex and more desirable form and to render the enzyme, to be presently referred to, and especially the peptase more active. The solution is then boiled, for a short time, as above referred to, and after boiling the free pulp is separated by means of a suitable press and the pectose liquor is then cooled down to about 120 degrees F.

I now add to the solution while maintaining the same at a temperature from 110 to 120 degrees F., a comminuted fungi growth which possesses an abundance of both diastatic and proteolytic enzymatic power. This fungi is grown upon the bran of wheat, rice or other cereals from which the starchy matter has been removed and contains fully matured or ripe microscopic mycelial fungi such as the species *eurotium oryzoe* (Ahlburg) of the genus Aspergillus, the genera Mucor Penecillium or Amylomyces Rouxii. The diastatic action of this fungus converts the starch in the solution into dextrose and maltose and possesses the property of both liquefying and saccharifying the starch constituents. This starch conversion takes place while the solution is hot and is desirable in order to permit of filtration. The albuminoid constituents of the solution do not in any way prevent or retard the filtration of the solution and the proteolytic action of the enzyme, which is principally in the nature of a peptonizing ferment necessary to convert the albuminoids into the desirable simpler forms, occurs more slowly and ordinarily from two to three hours are required during which the proteolytic action must continue before the conversion is completed to such an extent as to liquefy the albuminoids. However, it is not possible to state the exact time for this conversion which will depend greatly upon the amount of albuminoids present in the solution and the particular enzyme and the strength thereof. I have referred to a fungus in which both the diastatic and proteolytic enzymatic powers are combined, but it will be understood that it is within the scope of my invention to segregate these properties of the enzyme and separately add the same to the solution. In other words, that portion of the fungus possessing diastatic power may be added to the solution while hot to effect the conversion of the starch into dextrose and maltose and after filtration of the solution that portion of the fungi having proteolytic, especially peptatic power, may be added.

As is well known, albumens are classified as simple proteins. It has been determined that decomposition of protein substances may be brought about by oxidation or hydrolysis, but inasmuch as the hydrolytic procedure is productive of more satisfactory results that type of decomposition is practically the only one used at present. Hydrolysis of the protein molecule is most commonly produced by the use of proteolytic enzymes and in the process of hydrolysis the protein molecule is gradually broken down and less complicated aggregates than the original molecule are formed which are known as proteoses, peptones and peptides, but which still possess true protein characteristics. Further hydrolysis causes the ultimate transformation of these substances of a protein nature into the amino acids of known chemical structure. Following the peptides there is a diverse assortment of monamino and diamino acids which constitute the final products of the protein decomposition. These acids are devoid of any protein characteristics and are, therefore, decidedly different from the original substances from which they were derived. From a protein of huge molecular weight, a typical colloid, perhaps but slightly soluble and entirely non-diffusible, we have passed by way of proteoses, peptones, and peptides to a class of simplier crystalline substances which are, for the most part, readily soluble and diffusible. In short, the general plan of the hydrolysis of the protein molecule is similar to hydrolysis of starch. In the case of starch, the hydrolysis of which is due to the diastatic enzymatic action of the enzyme above referred to, there is formed a series of dextrines of gradually decreasing complexity and coincidental with the formation of each dextrine, a small amount of sugar is split off and finally nothing but sugar remains. In the case of protein hydrolysis there is a series of proteins of gradually decreasing complexity produced and coincidental with the formation of each new protein substance amino acids are split off and finally the sole products remaining are amino acids.

The action of the enzyme is increased or decreased in velocity by the nature of the surrounding media, certain enzymes being more active in an acid solution while others require an alkaline fluid. The addition of the phosphoric or lactic acid greatly facilitates the proteolytic action of the enzyme upon the albuminoids. It has been customary in the use of jelly bases to add an acid in order that a firm, well set jelly having high lustre or brilliancy will be produced. In such cases the objectionable albuminoid turbidity or cloudiness is especially prevalent, the jelly not being treated with a peptonizing ferment.

After filtration, the solution is evaporated in vacuo to the desired consistency and during such evaporation and subsequent thereto the proteolytic action of the fungus continues so that the conversion of all albuminoids into more desirable forms is assured and these albuminoids will not be present in the form of a cloudy precipitant. The enzyme to which I have above referred is substantially free of albumen so that in the use of this enzyme the natural albumen content of the extract or solution will not be increased.

If desired I may evaporate all of the moisture so as to reduce the jelly base from the form of a concentrated solution to a dry or powdered form in which all of the gelatinizing properties of the original pectose solution will be retained, as well as the other desirable attributes referred to.

From the foregoing it is thought that the nature of my improved process and the manner in which the same may be carried out will be fully undertsood. By peptonizing the albuminoids by the use of a proteolytic enzyme into more desirable forms, when water, sugar and, if necessary, acid are added to the base, either in the form of a concentrated solution or in the form of a powder, and when either hot or cold, objectionable cloudiness or turbidity which has heretofore been present will not occur but, on the contrary, an absolutely clear, firm and brilliant jelly of high lustre will be obtained.

It will be understood that in the operation of the process the conversion of the starch into sugar may be readily ascertained by the well known iodin tests, namely: when a sample treated with iodin does not show a blue or purple reaction.

I have demonstrated in practice that the mere conversion of the starch into sugar is not sufficient to eliminate cloudiness in the jelly but that such cloudiness continues and is due to the presence of albuminoids. I then discovered that by the use of a specific fungus possessing both diastatic and proteolytic powers, cloudiness or turbidity from both of these causes, namely: starch or albumen, could be readily obviated. I have, therefore, secured this desirable result without prolonging the processes heretofore used necessitating long continued boiling and destruction of pectin to clear the juice, increasing the cost of operations or in any way deleteriously effecting the jellifying properties of the final product.

From the foregoing description it will be understood that the present improvement in the art relates more particularly to the complete conversion of all albuminous matters in the extract into more desirable modified forms so they will never be visible in the final product in the form of a cloudy precipitant. I have herein referred to several fungi growths which possess the desired enzymatic properties whereby the conversion of the albuminoids may be obtained. It is, however, to be understood that I do not desire to be limited to the use of such fungi growths as it may be possible, and in some cases desirable, to employ various other known enzymes which possess the power of re-acting with proteins in the presence of a slightly acid media whereby the conversion of the proteins into the modified forms is effected. Further, it is apparent that in many instances the several steps of the process as hereinbefore referred to must necessarily have to be modified in minor particulars. It is accordingly to be understood that the foregoing description is merely illustrative of one desirable mode of practicing the present invention and that the privelege is reserved of adopting all such legitimate modifications thereof as may be fairly embodied within the spirit and scope of the appended claims.

For instance, in the processing of grapes, rhubarb, beets, or other fruits or vegetables which do not contain starch but are rich in pectin, an enzyme is employed which has only a proteolytic action and is devoid of diastatic power. There are many enzymes of this nature which have been commercially produced, such for instance as pepsin and which will have a re-action with the albuminoids or other proteins in the extract in the presence of a slightly acid media, which results in producing a peptonizing ferment whereby the albuminoids are converted into the simpler and more desirable forms.

I claim:

1. In the art of jelly making, that step which consists in adding to a pectose extract obtained from vegetable pulp, a fungus possessing both diastatic and fermenting properties active in slightly acid media to convert the starch and albumen constituents of the extract into modified forms and prevent precipitation thereof.

2. In the art of jelly making, adding lactic acid to a pectose extract obtained from vegetable pulp to increase the acidity to approximately two-tenths of one percent and then adding a proteolytic enzyme active in the slightly acid media to convert the albuminoids in the extract into modified forms and prevent precipitation thereof.

3. In the art of jelly making, the process which consists in providing a watery solution containing vegetable material, adding lactic acid thereto, boiling the solution to release the pectose matters from the vegetable material, then separating the vegetable pulp and cooling the pectose extract, and finally adding to the extract while the same is above normal room temperature a proteolytic enzyme active in the acid media to convert the albuminoids in the extract into modified forms and prevent precipitation thereof.

4. In the art of jelly making, the process which consists in adding lactic acid to a solution containing vegetable material, boiling the solution to release the pectose matters from the vegetable material, removing the vegetable pulp from the solution and cooling the pectose extract to approximately 120 degrees F., and then adding to the extract a peptonizing ferment active in the slightly acid media to convert the albuminoids in the extract into modified forms and prevent precipitation thereof.

5. In the art of jelly making, adding lactic acid to a solution containing vegetable material to produce an acidity therein of approximately two-tenths of one percent, then boiling the solution to release the pectose matters from the vegetable material, then removing the vegetable pulp and cooling the pectose extract to approximately 120 degrees F., and finally adding a fungus to the extract while at approximately the latter temperature possessing both diastatic and fermenting properties and active in the slightly acid media to convert the starch into sugar and simultaneously convert the albuminoids in the extract into modified forms and prevent precipitation thereof.

6. In the art of jelly making, the process which consists in adding lactic acid to a solution containing vegetable material to produce an acidity of approximately two-tenths of one percent, then boiling the solution to release the pectose matters from the vegetable material and cooling the pectose extract to approximately 120 degrees F., then adding to the extract while approximately at the latter temperature a comminuted fungus growth possessing both diastatic and proteolytic enzymatic properties active in the slightly acid media to concurrently effect the conversion of the starch into sugar and of the albuminoids in the extract into modified forms, then filtering the extract to remove the solids therefrom, the proteolytic action continuing after filtration, and finally evaporating the extract to a desired viscosity or reducing said extract to powdered form.

In testimony that I claim the foregoing as my invention, I have signed my name hereunder.

AAGE GUSMER.